United States Patent
Shiu et al.

(10) Patent No.: US 11,750,582 B2
(45) Date of Patent: Sep. 5, 2023

(54) NETWORK APPARATUS CONTROLLING METHOD AND DEVICE

(71) Applicant: Gunitech Corp., Qionlin Township, Hsinchu County (TW)

(72) Inventors: Huan-Ruei Shiu, Qionlin Township (TW); Chung-Liang Hsu, Qionlin Township (TW); Xiao-Juan Lin, Qionlin Township (TW); Po-Chun Tung, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 417 days.

(21) Appl. No.: 17/165,171

(22) Filed: Feb. 2, 2021

(65) Prior Publication Data

US 2022/0191179 A1 Jun. 16, 2022

(30) Foreign Application Priority Data

Dec. 15, 2020 (TW) .................................. 109144314

(51) Int. Cl.
*H04L 29/06* (2006.01)
*H04L 9/40* (2022.01)
*H04W 4/80* (2018.01)
*H04W 84/18* (2009.01)

(52) U.S. Cl.
CPC .......... *H04L 63/0471* (2013.01); *H04L 63/06* (2013.01); *H04W 4/80* (2018.02); *H04W 84/18* (2013.01)

(58) Field of Classification Search
CPC ... H04L 63/0471; H04L 63/06; H04L 9/0861; H04L 9/3226; H04L 63/0281; H04L 67/125; H04W 4/80; H04W 84/18; H04W 12/043; H04W 12/041; H04W 12/02
See application file for complete search history.

(56) References Cited

U.S. PATENT DOCUMENTS

| 2015/0194000 A1* | 7/2015 | Schoenfelder | G07C 9/00309 340/5.61 |
| 2016/0094398 A1* | 3/2016 | Choudhury | H04L 45/42 370/254 |
| 2017/0142230 A1* | 5/2017 | Hou | H04L 69/30 |
| 2020/0169861 A1* | 5/2020 | Hu | H04W 88/16 |

FOREIGN PATENT DOCUMENTS

| CN | 110267267 A | * | 9/2019 | |
| CN | 108366362 B | * | 2/2021 | ............ H04W 12/02 |

* cited by examiner

Primary Examiner — Harunur Rashid
(74) Attorney, Agent, or Firm — Alan D. Kamrath; Karin L. Williams; Mayer & Williams PC

(57) ABSTRACT

A network apparatus controlling method includes: in a device configuration stage, causing the libraries of a plurality of node devices to have the same network key; electrically connecting to the intermediary node device; obtaining the device name of the intermediary node device; according to the device name, identifying the library of the intermediary node device and the content of the library to confirm an accessing encryption process used by the library; and switching to the accessing encryption process to complete the accessing encryption process between the network apparatus controlling device and the intermediary node device such that the network apparatus controlling device can send an order data to the plurality of node devices in the mesh network via the intermediary node device.

12 Claims, 2 Drawing Sheets

NETWORK APPARATUS CONTROLLING METHOD AND DEVICE

BACKGROUND OF THE INVENTION

1. Field of the Invention

The present invention relates to a network apparatus controlling method and device; more particularly, the present invention relates to a network apparatus controlling method and device for integrating and controlling different Bluetooth mesh devices.

2. Description of the Related Art

Currently, there are many Bluetooth mesh device developers on the market selling various kinds of Bluetooth mesh devices. Those Bluetooth mesh devices can function as nodes to communicate with one another to achieve a greater communication range, as well as greater flexibility and expandability. When any one of the Bluetooth mesh devices breaks down, other Bluetooth mesh devices can still provide the node function of transferring information such that the mesh network can still work normally.

However, because those Bluetooth mesh devices belong to different developers, some devices are not compatible with those of other developers, such that each of the developers has its own Bluetooth application, and each of the developers may set up a different network encryption process for their own Bluetooth mesh devices. If the user forces the Bluetooth mesh devices of different developers to match the Bluetooth applications of other manufacturers, the Bluetooth application may crash, or the Bluetooth mesh device cannot be accessed because the network encryption processes are different. Thus, the user must use different Bluetooth applications for the Bluetooth mesh devices of different developers, and this necessity is very inconvenient for the user.

Therefore, there is a need to provide a new integrating and controlling method in the mesh network which can integrate and control different Bluetooth mesh devices.

SUMMARY OF THE INVENTION

It is an object of the present invention to provide a network apparatus controlling method for integrating and controlling different Bluetooth mesh devices.

To achieve the abovementioned object, a network apparatus controlling method of the present invention is applied to a network apparatus controlling device for controlling a plurality of node devices in a mesh network. The plurality of node devices each includes a library and a device name corresponding to the library, and each library includes a network key. The network apparatus controlling device includes a database, and the database stores data of the device names and the libraries of each of the plurality of node devices. The plurality of node devices include an intermediary node device. The network apparatus controlling method includes the steps of: causing, in a device configuration stage, the library of the plurality of node devices to have the same network key; electrically connecting to the intermediary node device; obtaining the device name of the intermediary node device; according to the device name, identifying the library of the intermediary node device and a content of the library to confirm an accessing encryption process used by the library; and switching the accessing encryption process to correspond to the library so as to complete the accessing encryption process between the network apparatus controlling device and the intermediary node device such that the network apparatus controlling device can send an order data to the plurality of node devices in the mesh network via the intermediary node device.

According to one embodiment of the present invention, the network key is a 32-bit password.

According to one embodiment of the present invention, the network key includes an application key and a network layer key.

According to one embodiment of the present invention, the step of causing, in the device configuration stage, the library of the plurality of node devices to have the same network key further includes: generating a network key.

According to one embodiment of the present invention, the network apparatus controlling device further includes a network key generating module and a device management module. The device configuration stage is such that, when the network apparatus controlling device accesses each of the plurality of node devices for the first time, the network key generating module generates a network key, and the device management module sets up the network key.

According to one embodiment of the present invention, the order data includes a setting order, and the network apparatus controlling device accesses the intermediary node device via the network key to obtain a setting up authority of the library corresponding to the intermediary node device so as to set up the library corresponding to the intermediary node device.

According to one embodiment of the present invention, the order data includes a controlling order, and the network apparatus controlling device sends the controlling order to one of the plurality of node devices in the mesh network via the library corresponding to the intermediary node device.

Another object of the present invention is to provide a Bluetooth mesh device for integrating and controlling different Bluetooth mesh devices.

To achieve the abovementioned object, the network apparatus controlling device of the present invention is applied to a mesh network, wherein the mesh network is formed via a plurality of node devices, and the plurality of node devices each include a library and a device name corresponding to the library. The library includes a network key. The plurality of node devices include an intermediary node device. The network apparatus controlling device includes a database, a device management module, a network module, a node name obtaining module, a library identification module and a setting module. The database is used for storing a data of the device name and the library of the plurality of node devices. The device management module is used for causing the library of the plurality of node devices to have the same network key in a device configuration stage. The network module is used for electrically connecting to the intermediary node device. The node name obtaining module is used for obtaining the device name of the intermediary node device. The library identification module is used for identifying the library of the intermediary node device and a content of the library according to the device name so as to confirm an accessing encryption process used by the library. The setting module is used for switching the accessing encryption process to correspond to the library so as to complete the accessing encryption process between the network apparatus controlling device and the intermediary node device such that the network apparatus controlling device can send an order data to the plurality of node devices in the mesh network via the intermediary node device.

According to one embodiment of the present invention, the network apparatus controlling device further includes a network key generating module, which is used for generating the network key in the device configuration stage.

According to one embodiment of the present invention, the network apparatus controlling device further includes a device management module. The device configuration stage is such that, when the network apparatus controlling device accesses each of the plurality of node devices for the first time, the network key generating module generates the network key, and the device management module sets up the network key.

DETAILED DESCRIPTION OF THE PREFERRED EMBODIMENT

Figure 1:
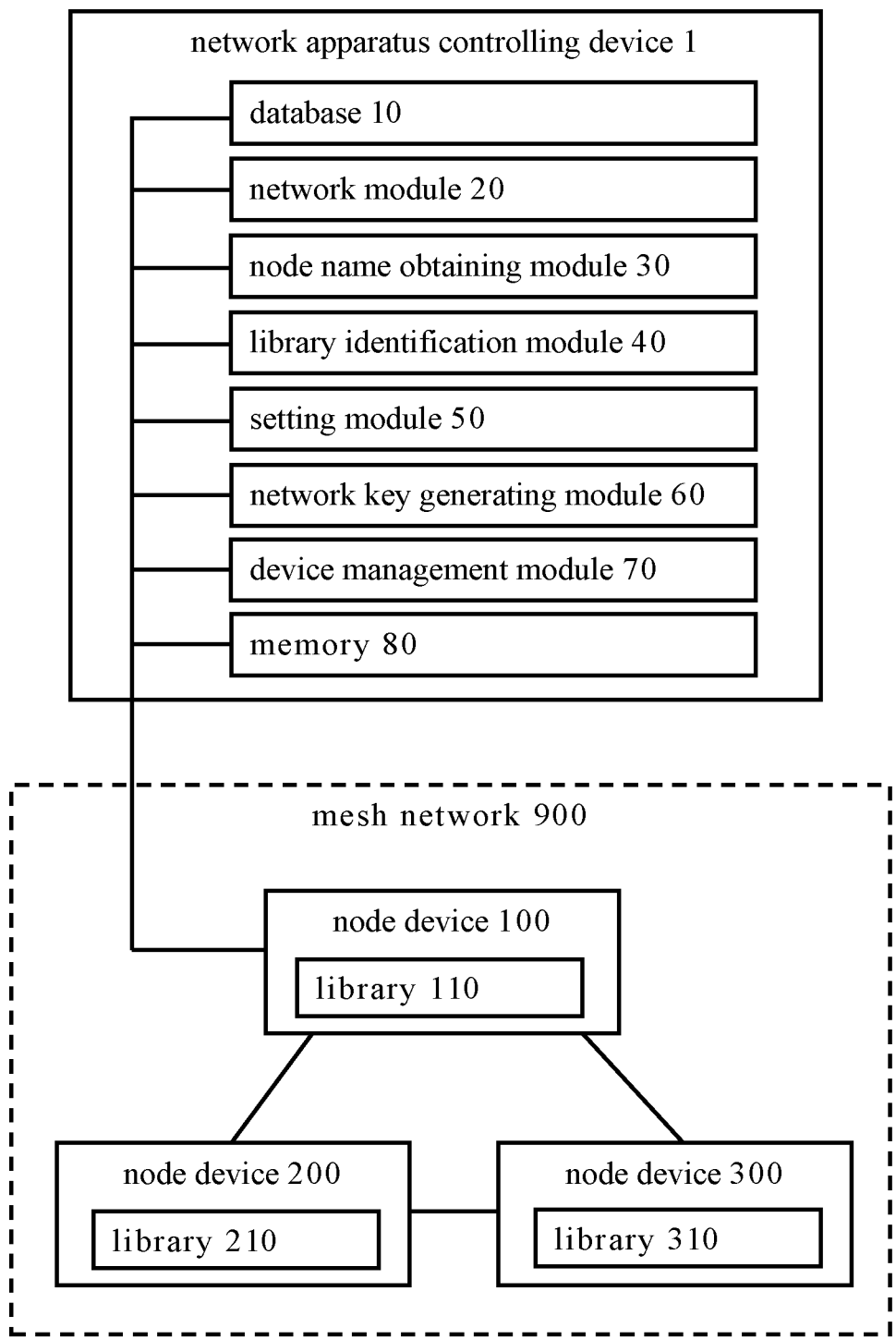
FIG. 1 illustrates a system structure drawing of the network apparatus controlling device and the node devices which form the mesh network in one embodiment of the present invention.
Figure 2:
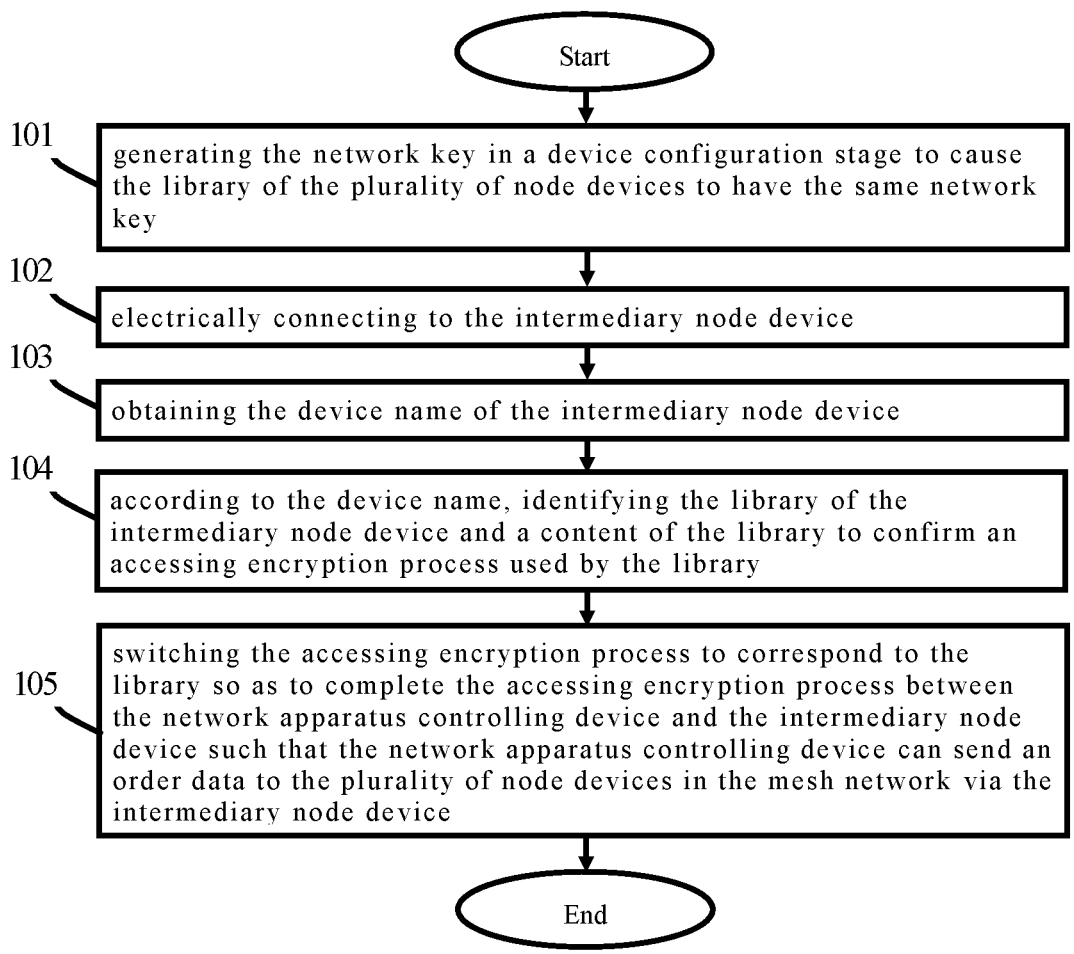
FIG. 2 illustrates a step flowchart of the network apparatus controlling method in one embodiment of the present invention.

Please refer to FIG. 1 and FIG. 2, which illustrate the network apparatus controlling method and device for integrating and controlling the mesh network in one embodiment of the present invention. FIG. 1 illustrates a system structure drawing of the network apparatus controlling device and the node devices which form the mesh network in one embodiment of the present invention. FIG. 2 illustrates a step flowchart of the network apparatus controlling method in one embodiment of the present invention.

As shown in FIG. 1, in one embodiment of the present invention, the network apparatus controlling device 1 and the network apparatus controlling method are used for controlling the Bluetooth mesh devices made by different Bluetooth manufacturers in the Bluetooth network environment, such that the user does not need to use different operation software programs for the Bluetooth mesh devices made by different Bluetooth manufacturers, to improve the convenience. The network apparatus controlling device 1 is a smart phone, and a software application is installed in the smart phone for integrating and controlling a plurality of node devices 100, 200, 300. The plurality of node devices 100, 200, 300 are household appliances with the Bluetooth mesh network function, and the node devices 100, 200, 300 of the present invention are respectively a lamp, a refrigerator, and a speaker, but the types of the node devices are not limited to the abovementioned description.

The plurality of node devices 100, 200, 300 respectively include libraries 110, 210, 310 and device names corresponding to the libraries 110, 210, 310; the device names of the node devices 100, 200, 300 are respectively "lamp A01", "refrigerator B02" and "speaker C03", and the plurality of node devices 100, 200, 300 are electrically connected to one another to form a mesh network 900. Each of the libraries 110, 210, 310 can respectively manage and execute the functions of each of the node devices 100, 200, 300; for example, the node devices 100, 200, 300 can be electrically connected to one another via the Bluetooth function to act as nodes for sending data to one another, and each of the libraries 110, 210, 310 has different network encryption processes and network keys to ensure security for sending data. The network key is a 32-bit password, and the network key includes an application key and a network layer key. The application key is used for protecting the application layer data and protecting the related data security of the specific application (such as lighting and temperature control). The network layer key is used for providing the access authority of the specific network or subnet; the node must have the network layer key to become a member of the network so that the node can decrypt and verify the data of the network layer. In addition, each of the libraries 110, 210, 310 also records the data of the node devices 100, 200, 300, such as the manufacturers and device names of each of the node devices 100, 200, 300; when each of the libraries 110, 210, 310 sends the data, the libraries 110, 210, 310 will make the data of the manufacture and the device name of each of the node devices 100, 200, 300 into the a packet and transfer the packet and other data together. In the present embodiment, the network apparatus controlling device 1 and the node devices 100, 200, 300 all use the Bluetooth Mesh Profile specification released by the Bluetooth Special Interest Group (SIG). People with common knowledge of this technology field should understand that the Bluetooth Special Interest Group released the Bluetooth Mesh Profile specification version 1.0 on Jul. 13, 2017, and released the Bluetooth Mesh Profile specification version 1.0.1 on Jan. 21, 2019. The node of the Bluetooth mesh device includes Provisioner/Node Features/Element/Model, the node of the Bluetooth mesh device includes a configuration function, and the configuration mainly uses the security standard mechanism to configure the related keys (such as the application key, the network layer key, and the unicast address) to the unprovisioned device. After the device has the approved application key and network layer key, the device will become a node in the Bluetooth mesh network 900 such that the node can transfer data to other nodes. It is to be known that the principle of configuring the key of a node of the Bluetooth mesh network is already disclosed in the art of Bluetooth network technology, so there is no need for further description.

The network apparatus controlling device 1 includes a database 10, a network module 20, a node name obtaining module 30, a library identification module 40, a setting module 50, a network key generating module 60, a device management module 70 and a memory 80.

The database 10 stores the access log and the data of the device names of the libraries 110, 210, 310 of the plurality of node devices 100, 200, 300. The network module 20 is a chip which supports the Bluetooth protocol and which is electrically connected to any one of the plurality of node devices 100, 200, 300; any node device 100, 200, 300 which is accessed is an intermediary node device, and an intermediary node device can transfer the receiving data to other node devices. The database 10 can cooperate with the network layer key, the application key and the encryption process of the libraries 110, 210, 310 of each of the node devices 100, 200, 300 to switch to the corresponding encryption. The intermediary node device is one of the plurality of node devices 100, 200, 300, and the intermediary node device is used for functioning as the transferring node of the mesh network such that the network apparatus controlling device 1 can access the other Bluetooth devices in the mesh network 900 via the node.

The node name obtaining module 30 is a chip or software application with the Bluetooth packet analysis function for obtaining the device name of the intermediary node device. The library identification module 40 is used for identifying the library corresponding to the node device according to the device name obtained by the node name obtaining module 30. After the library identification module 40 identifies the corresponding library, the library identification module 40 can further identify the encryption process used by the network function in the library and transfer the encryption process to the setting module 50 so that the setting module 50 can switch the accessing encryption process to correspond to the library, such that the accessing encryption process of the network apparatus controlling device 1 and the intermediary node device can be compatible to transfer data.

The setting module 50 is a chip or software application with a connection encryption setting function and is used for completing the accessing encryption process between the network apparatus controlling device 1 and the intermediary node device according to the library such that the network apparatus controlling device 1 can transfer an order data to the plurality of node devices 100, 200, 300 in the mesh network 900 via the intermediary node device.

The network key generating module 60 is a chip or software application with a network key generating function and is used for generating a network key in a device configuration stage. The device management module 70 is a chip or software application with a network key setting function and is used for setting the network key generated by the network key generating module 60 in the node devices 100, 200, 300 in the device configuration stage. The device configuration stage is the stage when the network apparatus controlling device 1 accesses each of the plurality of node devices 100, 200, 300 for the first time.

The memory 80 is electrically connected to the database 10, the network module 20, the node name obtaining module 30, the library identification module 40, the setting module 50, the network key generating module 60 and the device management module 70. The memory 80 is used for storing the necessary data and software for executing the network apparatus controlling method for integrating and controlling the mesh network.

As shown in FIG. 1 and FIG. 2, the network apparatus controlling method of the present invention is a software application that is stored in the memory 80, and the software application can be displayed on the touch screen of the network apparatus controlling device 1 such that the user can operate it. When the user wants to set or control the plurality of node devices 100, 200, 300, the user can use the network apparatus controlling device 1 to execute step 101 of the network apparatus controlling method: generating the network key in a device configuration stage such that the library of the plurality of node devices will have the same network key.

When the network apparatus controlling device 1 accesses each of the node devices 100, 200, 300 via the network module 20 for the first time, the network apparatus controlling device 1 will check the access log stored in the database 10 to verify if it is the first time that the network apparatus controlling device 1 accesses the network. If it is the first time that the network apparatus controlling device 1 accesses the network, the device configuration stage will be executed, and the network key generating module 60 will generate a network key for the Bluetooth network. The network key is a randomly-generated 32-bit password, and the network key includes an application key and a network layer key, but the type of the network key is not limited to the abovementioned description. The device management module 70 will set up the network key generated by the network key generating module 60 in the libraries 110, 210, 310 of the node devices 100, 200, 300 such that each of the libraries 110, 210, 310 has the same network key; therefore, the network apparatus controlling device 1 can use the same network key to access to each of the node devices 100, 200, 300 and obtain the user authority of each of the node devices 100, 200, 300. In the device configuration stage, when the network apparatus controlling device 1 accesses each of the node devices 100, 200, 300, the network apparatus controlling device 1 will also analyze the packets sent by each of the node devices 100, 200, 300, to obtain the data of the device names of the libraries 110, 210, 310 of the node devices 100, 200, 300 to store them in the database 10.

Then the network apparatus controlling device 1 executes step 102 of the network apparatus controlling method: electrically connecting to the intermediary node device.

As in the abovementioned description, the plurality of node devices already have the same network key; thus, the network module 20 can be electrically connected to any one of the plurality of node devices 100, 200, 300 via the same network key and consider the connecting one of the node devices 100, 200, 300 to be an intermediary node device. In the present embodiment, the network module 20 is electrically connected to the node device 100 which is considered as the intermediary node device.

Then the network apparatus controlling device 1 executes step 103 of the network apparatus controlling method: obtaining the device name of the intermediary node device.

When the network module 20 is electrically connected to the node device 100, the network module 20 will also receive the Bluetooth network packet sent by the node device 100, and the Bluetooth network packet will be sent to the node name obtaining module 30. In the present embodiment, the node name obtaining module 30 can analyze the packet and parse out that the name of the node device 100 of the intermediary node device is "lamp A01" and the manufacturer is "Company X".

Then the network apparatus controlling device 1 executes step 104 of the network apparatus controlling method: according to the device name, identifying the library of the intermediary node device and a content of the library to confirm an accessing encryption process used by the library.

After the node name obtaining module 30 parses out that the name of the node device 100 of the intermediary node device is "lamp A01" and the manufacturer is "Company X", then since each of the libraries 110, 210, 310 has respectively recorded the related data of the node devices 100, 200, 300, such as the manufacturer and device of each of the node devices 100, 200, 300, the library identification module 40 can identify that the node device 100 corresponds to the name "lamp A01" from the packet content according to the name, and the node device 100 corresponds to the library 110, wherein the content of the library 110 records the type of the encryption process of the network function executed by the library 110. Thus, the library identification module 40 can furthermore identify the encryption process of the network function of the library 110. The library identification module 40 can confirm an accessing encryption process used by the library according to the identifying content of the library 110 and transfer the confirming accessing encryption process to the setting module 50.

Finally, the network apparatus controlling device 1 executes step 105 of the network apparatus controlling method: switching the accessing encryption process to correspond to the library to complete the accessing encryption process between the network apparatus controlling device and the intermediary node device such that the network apparatus controlling device can send an order data to the plurality of node devices in the mesh network via the intermediary node device.

After the confirming accessing encryption process is transferred to the setting module 50, the setting module 50 will switch to the accessing encryption process corresponding to the library to complete the accessing encryption process between the network apparatus controlling device 1 and the intermediary node device such that the network apparatus controlling device 1 and the node device 100 of the intermediary node device can be compatible to send data to each other.

After the accessing encryption process is completed, the network apparatus controlling device 1 can send an order data to the other node devices 200, 300 in the mesh network 900 via the node device 100 of the intermediary node device. The order data includes a setting order. The network apparatus controlling device 1 accesses the node device 100 of the intermediary node device via the network key to obtain the setting up authority of the library 110 corresponding to the node device 100 of the intermediary node device so as to set the library 110 corresponding to the node device 100 of the intermediary node device.

The order data can further include a controlling order (such as "playing music"), and the network apparatus controlling device 1 can transfer the controlling order to another node device 300 which is to be controlled in the mesh network 900 via the library 110 corresponding to the node device 100 of the intermediary node device; whereby, the network apparatus controlling device 1 can control the node device 300 to play music via the node of the intermediary node device.

Via the network apparatus controlling device 1 and the network apparatus controlling method for integrating and controlling the mesh network of the present invention, the node devices of different manufacturers can be cross-platform integrated and controlled. Although the encryption process, operating software and network key of each of the manufacturers are different, they are all built on the common Bluetooth mesh network structure and principles; therefore, by unifying the network key of each of the node devices, giving orders through a single operation software application, and identifying the library of each of the node devices to change the encryption process, the mesh network node devices can be compatible such that the node devices made by different manufactures can send information to one another, control one another, and achieve the effect that a single software application can control devices of multiple manufacturers at the same time, to improve the convenience.

What is claimed is:

1. A network apparatus controlling method, applied to a network apparatus controlling device, for controlling a plurality of node devices in a mesh network, wherein the plurality of node devices respectively comprise a library and a device name corresponding to the library, the library comprises a network key, the network apparatus controlling device comprises a database, the database stores a data of the device name and the library of the plurality of node devices, and the plurality of node devices comprise an intermediary node device, the network apparatus controlling method comprising:
   in a device configuration stage, causing the library of the plurality of node devices to have the same network key;
   electrically connecting to the intermediary node device;
   obtaining the device name of the intermediary node device;
   according to the device name, identifying the library of the intermediary node device and a content of the library to confirm an accessing encryption process used by the library; and
   switching the accessing encryption process to correspond to the library to complete the accessing encryption process between the network apparatus controlling device and the intermediary node device such that the network apparatus controlling device send an order data to the plurality of node devices in the mesh network via the intermediary node device wherein the order data comprises a setting order, and the network apparatus controlling device accesses the intermediary node device via the network key to obtain a setting up authority of the library corresponding to the intermediary node device to set up the library corresponding to the intermediary node device.

2. The network apparatus controlling method as claimed in claim 1, wherein the network key is a 32-bit password.

3. The network apparatus controlling method as claimed in claim 1, wherein the network key comprises an application key and a network layer key.

4. The network apparatus controlling method as claimed in claim 3, wherein the step of allowing the library of the plurality of node devices to have the same network key in the device configuration stage further comprises: generating the network key.

5. The network apparatus controlling method as claimed in claim 4, wherein the network apparatus controlling device further comprises a network key generating module and a device management module; the device configuration stage is such that, when the network apparatus controlling device accesses each of the plurality of node devices for the first time, the network key generating module generates the network key, and the device management module sets up the network key.

6. The network apparatus controlling method as claimed in claim 1, wherein the order data comprises a controlling order, and the network apparatus controlling device sends the controlling order to one of the plurality of node devices in the mesh network via the library corresponding to the intermediary node device.

7. A network apparatus controlling device, applied to a mesh network, wherein the mesh network is formed via a plurality of node devices, the plurality of node devices each comprise a library and a device name corresponding to the library, and the library comprises a network key, wherein the plurality of node devices comprises an intermediary node device, the network apparatus controlling device comprising:
   a database, used for storing a data of the device name and the library of the plurality of node devices;
   a device management module, used for allowing the library of the plurality of node devices to have the same network key in a device configuration stage;
   a network module, used for electrically connecting to the intermediary node device;
   a node name obtaining module, used for obtaining the device name of the intermediary node device;
   a library identification module, used for identifying the library of the intermediary node device and a content of the library according to the device name to confirm an accessing encryption process used by the library;
   a setting module, used for switching the accessing encryption process to correspond to the library to complete the accessing encryption process between the network apparatus controlling device and the intermediary node device such that the network apparatus controlling device send an order data to the plurality of node devices in the mesh network via the intermediary node device wherein the order data comprises a setting order, and the network apparatus controlling device accesses the intermediary node device via the network key to obtain a setting up authority of the library corresponding to the intermediary node device so as to set up the library corresponding to the intermediary node device.

8. The network apparatus controlling device as claimed in claim 7, wherein the network key is a 32-bit password.

9. The network apparatus controlling device as claimed in claim 7, wherein the network key comprises an application key and a network layer key.

10. The network apparatus controlling device as claimed in claim 9, further comprising a network key generating module, used for generating the network key in the device configuration stage.

11. The network apparatus controlling device as claimed in claim 10, wherein the device configuration stage is such that, when the network apparatus controlling device accesses each of the plurality of node devices for the first time, the network key generating module generates the network key, and the device management module sets up the network key.

12. The network apparatus controlling device as claimed in claim 7, wherein the order data comprises a controlling order, and the network apparatus controlling device sends the controlling order to one of the plurality of node devices in the mesh network via the library corresponding to the intermediary node device.

* * * * *